United States Patent [19]
Hunsinger et al.
[11] 3,908,137
[45] Sept. 23, 1975

[54] APPARATUS AND METHOD FOR TRIPLE TRANSIT SIGNAL CANCELLATION IN AN ACOUSTICAL SURFACE WAVE DEVICE

[75] Inventors: Bill J. Hunsinger; Frederick Y. Cho, both of Fort Wayne, Ind.; Brian B. Fugit, Tempe, Ariz.

[73] Assignee: The Magnavox Company, Fort Wayne, Ind.

[22] Filed: Dec. 26, 1973

[21] Appl. No.: 420,038

[52] U.S. Cl. .................. 310/8.1; 310/9.8; 333/30 R; 333/72
[51] Int. Cl.² .................. H01L 41/08; H03H 7/30
[58] Field of Search .................. 310/8.1, 9.7, 9.8; 333/30 R, 72

[56] References Cited
UNITED STATES PATENTS

| | | | |
|---|---|---|---|
| 3,551,837 | 12/1970 | Speiser et al. | 310/9.8 X |
| 3,596,211 | 7/1971 | Dias et al. | 310/9.7 X |
| 3,662,293 | 5/1972 | De Vries | 310/9.8 X |
| 3,757,256 | 9/1973 | Whitehouse et al. | 333/30 R |
| 3,770,949 | 11/1973 | Whitehouse et al. | 310/9.8 X |
| 3,800,248 | 3/1974 | Speiser et al. | 310/9.8 X |
| 3,836,876 | 9/1974 | Marshall et al. | 310/9.8 X |

*Primary Examiner*—Mark O. Budd
*Attorney, Agent, or Firm*—Thomas A. Briody; William J. Streeter; Joe E. Barbee

[57] ABSTRACT

Apparatus and method for reduction of triple transit signals generated by the interaction between acoustic surface waves and transducer elements in acoustic surface wave devices. Input transducers are positioned such that the transit time between a first input transducer and an output transducer is delayed by a quarter of a wavelength relative to the transit time between a second input transducer and the output transducer. The input signal to the second input transducer is delayed externally by a length of time equivalent to a quarter of a wavelength. The output transducer signals can therefore be combined to produce an enhanced output signal. Acoustic surface waves generated at an output transducer and returned to the output transducer after interaction with the first input transducer will be retarded two quarter wave lengths (one for each transit) as compared to acoustic surface simultaneously generated at an output transducer and returned to the output transducer after interaction with the second input transducer. Because of the phase relationship, the signals generated at the output transducers as a result of acoustic wave interactions with the two input transducers will cancel when combined.

17 Claims, 2 Drawing Figures

APPARATUS AND METHOD FOR TRIPLE TRANSIT SIGNAL CANCELLATION IN AN ACOUSTICAL SURFACE WAVE DEVICE

BACKGROUND OF THE INVENTION

1. Field of the Invention

This invention relates generally to acoustic surface wave devices and more particularly to the reduction of noise signals generated at transducer electrodes by the interaction between acoustic surface waves and the transducer electrodes. Acoustic surface waves produced by reflections from an input transducer, after extraction of the desired signal by the output transducer, are reduced by the present invention.

2. Description of the Prior Art

In acoustic surface wave devices, varying electric signals, applied to properly-positioned transducer electrodes deposited on a piezoelectric substrate, generate acoustic waves which propagate along the substrate surface. Correspondingly, the passage of acoustic waves on the surface of a piezoelectric substrate through a region in which properly-positioned transducer electrodes have deposited, will generate an electric signal at the output of the transducer. These phenomena can be used to provide a group of devices having desirable transfer function characteristics.

However, the passage of an acoustic surface wave through a region of deposited transducer electrodes, i.e. the output transducer, typically does not result in complete absorption of the acoustic surface wave. In fact, a reflected acoustic surface wave is typically generated which propagates in the direction of the transducer which generated the initial acoustic surface wave. Similarly, the passage of the reflected acoustic surface wave through the region of the transducer responsible for propagating the original acoustic surface wave, causes a secondary reflected acoustic surface wave to be launched toward the output transducer. The passage of the secondary acoustic surface wave through the region of output transducer, causes an error signal, referred to as a triple transit signal, to be generated which can produce an unacceptable level of distortion in the signal of the output transducer.

One method of reducing the triple transit signal in acoustic surface wave devices is described in U.S. Pat. No. 3,662,293 entitled Acoustic Wave Transmitting Device, issued to Adrien J. De Vries and assigned to the Zenith Radio Corporation. In this method of triple transit signal cancellation, a second group of output transducer electrodes is provided which is displaced from the first group of output transducer electrodes by a quarter of a (acoustical) wavelength. The second output transducer, though not coupled to an external circuit, generates a second reflected acoustic surface wave, while the first output transducer generates a first reflected acoustic surface wave. Because of the quarter wave difference in transducer electrode separation, the first reflected acoustic surface wave arrives at the input (i.e. acoustic surface wave generating) transducer displaced by half a wavelength from second reflected surface wave. Thus the first and second acoustic surface waves produce cancelling effects at the input transducer and minimize generation of additional reflected acoustic waves. The difficulty of positioning the electrodes of the unconnected second output transducer and the difficulty of adjusting the amplitude of the reflected waves provide disadvantages of this method of triple transit cancellations.

It is therefore an object of the present invention to provide an improved acoustic surface wave device.

It is another object of the present invention to reduce undesired signals in an acoustic surface wave device resulting from acoustic surface wave reflection from transducer elements.

It is a more particular object of the present invention to provide apparatus for reducing noise signals generated by undesired interaction between the acoustic surface waves and transducer elements.

It is still another object of the present invention to provide an acoustic surface wave device with two paths for acoustic surface waves propagating away from and returning to an output transducer wherein the difference in the two paths is half a wavelength resulting in cancellation of error signals generated at the output transducer.

It is another more particular object of the present invention to provide a delay region between an input transducer and an output transducer, which in association with an external delay device and a second input transducer, reduces error signals caused by reflections of acoustic surface waves from transducer electrodes.

It is still a more particular object of the present invention to provide an acoustic surface wave device having two input transducers, an output transducer, a delay region between one input transducer and the output transducer, and an external delay line coupled to the second input transducer for providing two nearly equal triple transit acoustic waves, which because of the phase difference resulting from the delay region, produce generally cancelling signals at the output transducer.

SUMMARY OF THE INVENTION

The aforementioned and other objects of the present invention are accomplished by providing an acoustic surface wave device with an output transducer, an external signal delay device and two input transducers. The two input transducers are arranged so that acoustic surface waves generated simultaneously at the two input transducers, arrive at the output transducer from a first input transducer delayed by quarter of a wavelength relative to the acoustic surface waves generated by a second input transducer. In operation, however, the input signal to the second input transducer is applied first to the external signal delay, resulting in a retardation of the signal by a quarter of wavelength, before application to the second input transducer. The acoustic surface waves generated by the two input transducers therefore reach the output transducer in phase (i.e. both delayed by a quarter of wavelength) and result in an enhanced signal from the output transducer. The acoustic surface waves, returning to the output transducer by means of an acoustic surface wave reflection from the first input transducer, arrive delayed a half a wavelength from signals simultaneously emanating from the output transducer and returning to the output transducer by means of an acoustic surface wave reflection from the second input transducer. The delay of half a wavelength results in approximate signal cancellation.

The increase in transit time between the first input transducer and the output transducer, resulting in the quarter wavelength delay, can be the result of an additional transit region distance or of a deposition of an appropriate material in the transit region.

These and other features of the invention will be understood upon reading of the following description along with the drawings.

DESCRIPTION OF THE PREFERRED EMBODIMENT

Detailed Description of the Figures

Figure 1:
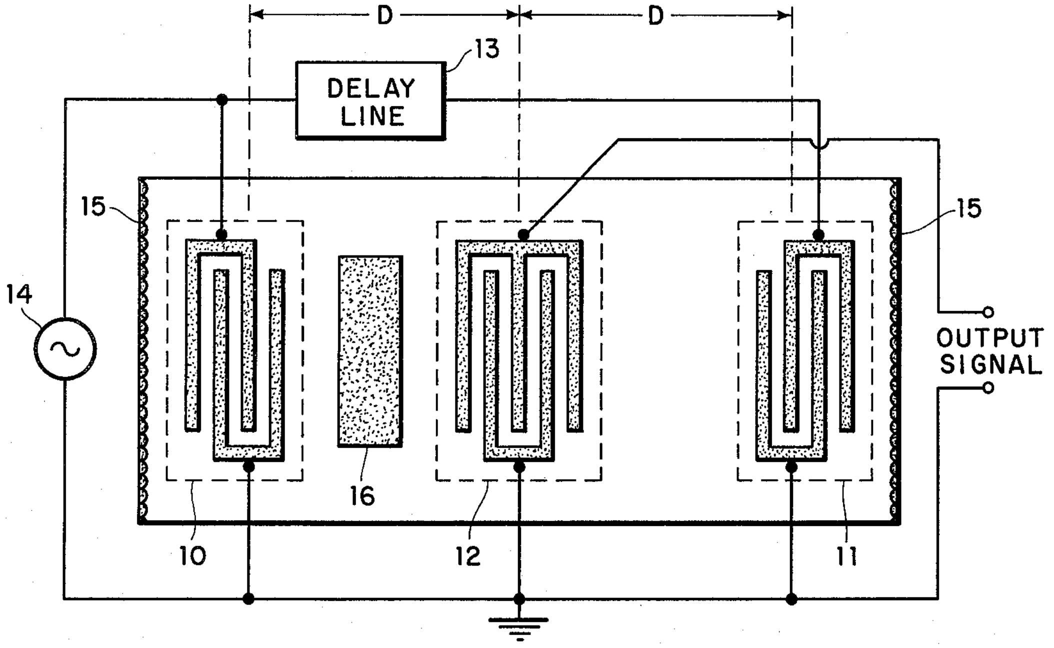
FIG. 1 is a schematic diagram of an acoustic surface wave device with triple transit signal cancellation according to the preferred embodiment.

Referring now to FIG. 1, metal electrodes are shown deposited on a substrate of piezoelectric material. These electrodes are grouped into a First Input Transducer 10, a Second Input Transducer 11, and an Output Transducer 12. In the embodiment illustrated by FIG. 1, the spacing D between the First Input Transducer 10 and the Output Transducer 12 is essentially equal to the spacing D between the Second Input Transducer 11 and the Output Transducer and the two Input Transducers are positioned on opposite sides of the Output Transducer. Between the first Input Transducer 10 and the Output Transducer 12 a Metallized Electrode 16 has been deposited. An absorbing Material 15 is placed on the periphery of the surface wave device and absorbs acoustic surface waves reaching this region, thereby minimizing edge-reflected acoustic surface waves from reentering the active region of the acoustic surface wave device.

An input signal from Signal Generator 14 is applied directly to terminals of the First Transducer 10. However, the input signal from Signal Generator 14 is applied to the terminals of the Second Input Transducer 11 through Delay Line 13. An output signal is applied to terminals of Output Transducer 12.

Figure 2:
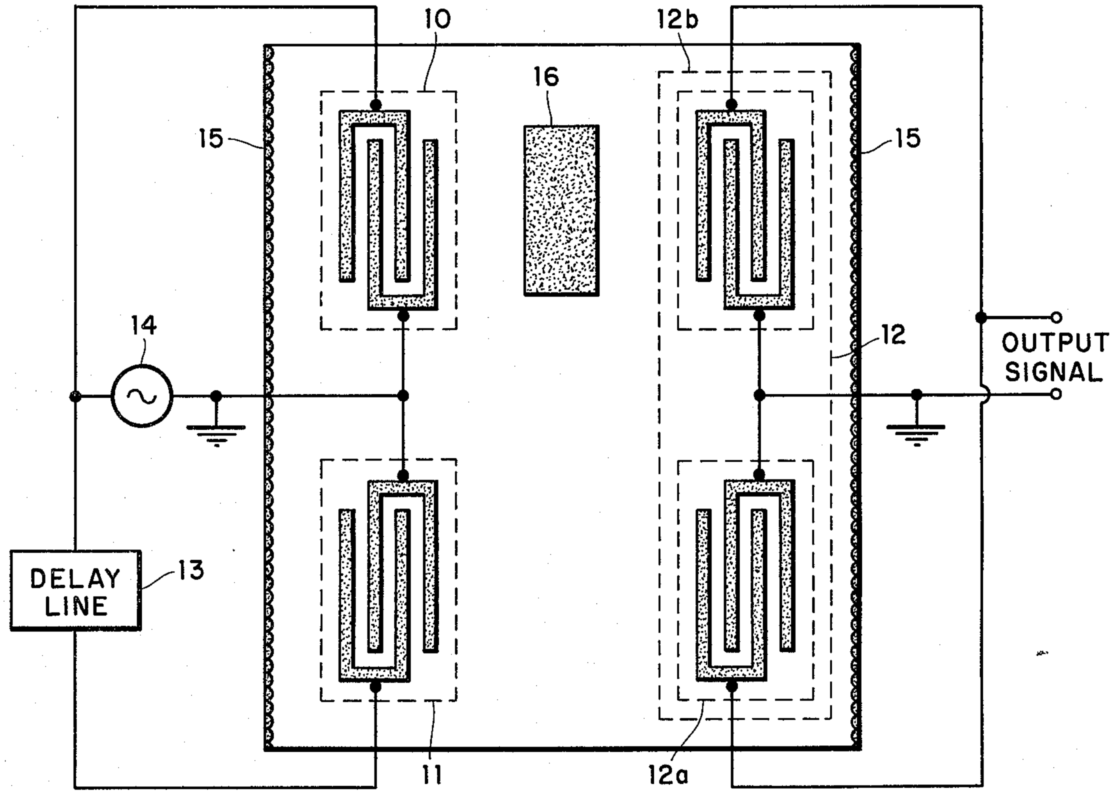
FIG. 2 is a schematic diagram of an alternative configuration of an acoustic surface wave device with triple transit signal cancellation.

Referring next to FIG. 2, an alternative arrangement for triple transit signal cancellation according to the present invention is shown. An input signal from Signal Generator 14 is again applied directly to terminals of the First Input Transducer 10 while the input signal applied to the Second Input Transducer 11 through Delay Line 13. Again Output Transducer 11 is equidistant from the First Input Transducer 10 and the Second Input Transducer 11 and a Metallized Electrode 16 is placed in the region between the First Input Transducer and the Output Transducer. However, Output Transducer 12 is divided into two transducer electrode groups, a First Output Transducer 12*b* and a Second Output Transducer 12*a*. The First Input Transducer generates acoustic surface waves which interact with the First Output Transducer, while the Second Input Transducer generates acoustic surface waves which interact with the Second Output Transducer. The output signal of the acoustic surface wave device applied to the terminals of Output Transducer 12.

Operation of the Preferred Embodiment

Referring again to FIG. 1, an input signal is applied to the First Input Transducer 10, and, after a delay of quarter of a wavelength, the input signal is applied to the Second Input Transducer 11. Acoustic surface waves are propagated in both directions from the transducer electrode arrays; however, the acoustic surface wave propagated toward the edge of the surface wave device are attenuated by Absorbing Material 15. The acoustic surface waves generated by the Second Input Transducer 11 in the opposite direction propagate directly toward the Output Transducer 12 with a velocity determined by the physical properties of a substrate. The acoustic surface waves generated by the First Input Transducer travel in a direction away from the nearest device edge, propagate to Output Transducer 12 through the region containing Metallized Electrode 16. The Metallized Electrode 16, deposited on the piezoelectric substrate, has the property that an acoustic surface wave, propagating through the region will be delayed by an additional quarter of a wavelength. However, attenuation of the acoustic surface wave is minor. Thus the acoustic surface waves generated by both the First Input Transducer 10 and the Second Input Transducer 11, because of the same quarter wavelength delay and the same transit time delay, interact with the Output Transducer 12 in phase, and cause an enhanced signal.

A first component of the acoustic surface wave generated by the First Input Transducer is not absorbed by the Output Transducer and propagated toward the Second Input Transducer. In addition, the interaction of the acoustic surface waves from the First and Second Input Transducer caused another acoustic surface wave component to be propagated toward the Second Input Transducer. When these two acoustic surface wave components reach the Second Input Transducer, a secondary acoustic surface wave is propagated toward the Output Transducer as a result of the Interaction between the Second Input Transducer and the acoustic surface wave. The interaction of secondary acoustic surface wave with the Output Transducer can produce an error signal in the output signal.

Because of the symmetry of the acoustic surface wave device, a secondary acoustic surface wave of approximately the same magnitude and shape reaches the Output Transducer from the First Input Transducer. However, the secondary acoustic surface wave and the acoustic surface wave causing the secondary acoustic surface wave have each traversed the Metallized Electrode region. The result of these two traversals is that the secondary acoustic surface reaching the Output Transducer from the First Input Transducer is delayed from the acoustic surface wave from the Second Input Transducer by half a wavelength. The half wavelength delay results in an approximate cancellation of the effect of the secondary acoustic signals in the output signals.

In FIG. 2, the cancellation of the secondary acoustic surface waves takes place in a similar manner. The acoustic surface waves generated by the First and Second Input Transducer are separated in this configuration; however, secondary acoustic surface waves from the First Input Transducer reaches the Output Transducer delayed by half a wavelength compared to secondary acoustic surface waves from the Second Input Transducer. The half wavelength delay occurs because of the double traversal of Metallized Electrode 16 by acoustic surface waves. The application of substantially identical signals, 180° out of phase results in nearly complete cancellation of the influence of the secondary surface waves in the output signal.

In this configuration, acoustic surface waves which are not absorbed by the Output Transducer do not interact with an Input Transducer, but are attenuated by Absorbing Material at the edge of the acoustic surface wave device.

In the preferred embodiment, a quarter wave delay has been added to one of two regions across which acoustic surface waves are propagated toward the Output Transducer. This delay could be synthesized by having the First Input Transducer spaced quarter of a wavelength farther from the Output Transducer than is the Second Input Transducer.

A range of frequencies is typically applied to an acoustic surface wave device. Thus the delay must be made with reference to a particular frequency. In a filter, for example, minimization of the noise at the filter design center frequency is typically desirable. The quarter wavelength form delay, i.e. of the External Delay, would be $T = 1/(4 \times f_o)$. Similarly, when a quarter wavelength delay region is desired, the $L/4 = v/(4 \times f_o)$ where $v_o$ is the velocity of an acoustic surface wave of frequency $f_o$. The selection of other frequencies at which to minimize noise signals will be apparent to those skilled in the art.

The above remarks have distinguished between the input and output portions of the surface wave device. Because of the linearity of the devices, the input and output portions can be interchanged and still display the characteristics described above.

The above description is included to illustrate the operation of the preferred embodiment and is not meant to limit the scope of the invention. The scope of the invention is to be limited only by the following claims. From the above discussion, many variations will be apparent to one skilled in the art that will yet be encompassed by the spirit and scope of the invention.

What is claimed is:

1. Apparatus for processing electrical signals comprising:

first delay means for delaying input electrical signals by a preselected period of time; and an acoustic surface wave device including, an acoustic-wave propagating medium, a first electroacoustic transducer coupled to said medium; a second electroacoustic transducer coupled to said medium; a third electroacoustic transducer coupled to said medium; said third transducer generating output electrical signals in response to interacting acoustic surface waves; said second electroacoustic transducer coupled to said delay means, said second transducer launching surface waves in response to said delayed input signals for interaction with said third transducer, wherein a portion of launched surface waves from said first transducer and said second transducer interact to generate undesired electrical signals; and a second delay means for delaying launched surface waves for substantially the same period as the first delay means, the second delay means being positioned to delay launched surface waves between the first electroacoustic transducer and the third electroacoustic transducer.

2. Apparatus of claim 1 wherein said preselected period of delay is substantially equivalent to the time for propagation of one quarter of said predetermined wavelength in said medium.

3. Apparatus of claim 2 wherein said second transducer and said first transducer are substantially equidistant from said third transducer, said longer period for acoustic surface wave transit between said third transducer and said first transducer caused by material deposited on said medium between said first and said third transducer.

4. Apparatus of claim 2 wherein the longer period for acoustic surface wave transit between said third transducer and said first transducer is caused by a greater distance between said first transducer and said third transducer compared to a distance between said third and said second transducer.

5. A device for processing electrical signals comprising: first delay means for electrically delaying an electrical signal for a preselected period of time; a substrate material for supporting propagation of acoustic surface waves; first transducer means for generating acoustic surface waves in said material in response to an electrical signal applied to a first terminal set and for producing a generated first signal in response to surface waves interacting with said first transducer means, said first transducer means coupled to said first delay means; second transducer means for generating acoustic surface waves in said material in response to an electrical signal applied to a second terminal set and for producing a generated second signal in response to surface waves interacting with said second transducer means, wherein the electrical signal applied to the first terminal set produces at least a portion of said generated second signal including a desired signal component resulting from a single transit of surface waves between said first and said second transducer means and an undesired signal component resulting from a triple transit of surface waves between said first and said second transducer means, wherein said electrical signal applied to the second terminal set produces said generated first signal including a desired signal component resulting from a single transit of surface waves between said second and said first transducer means and an undesired component resulting from a triple transit of surface waves between said second and said first transducer means; third transducer means for detecting acoustic surface waves in said material for producing a generated third signal in response to surface waves; and second delay means for delaying a transit of surface waves between said second and said third transducer means by said preselected period of time wherein application of an input electrical signal to said first delay means and to said second transducer means enhances a second signal desired component and inhibits the second signal undesired components.

6. The device of claim 5 wherein said second delay means is comprised of a metallized electrode deposited on said substrate.

7. The device of claim 5 wherein application of an input signal to said second transducer means enhances a desired signal component and inhibits an undesired signal component resulting from combining a generated third signal and a generated first signal delayed by said second delay means.

8. A signal processing device comprising: an acoustic-wave propagating medium; first transducer means responsive to a first input signal for launching in said medium acoustic surface waves related to a predetermined wavelength; second transducer means responsive to a second input signal for launching in said medium acoustic surface waves related to said predetermined wavelength; first delay means for delaying said first input signal to produce said second input signal, said first delay means delaying said first input signal by a preselected period of time; and third transducer means responsive to said acoustic waves from said first and said second transducer means to provide a desired output signal, wherein acoustic surface waves launched from said first transducer means are delayed relative to acoustic surface waves launched simultaneously by said second transducer means by a period of time substantially equal to the delay of the first delay means, wherein a portion of acoustic surface waves launched by said first transducer means which was reflected first from said third transducer means and then from said first transducer means produces an undesired signal in said third transducer means and wherein a portion of acoustic waves launched by said second transducer means which was reflected first by said third transducer means and then by said second transducer means are combined and substantially cancelled because of phase relationships of the reflected signals.

9. The signal processing device of claim 8 wherein at least a portion of delay between the first transducer means and the third transducer means is provided by deposition of a material on a surface of said medium between said first and said third transducer means.

10. The signal processing device of claim 8 wherein at least a portion of delay between the first transducer means and the third transducer means is provided by a distance between said first and said third transducer means being greater than a distance between said second and said third transducer means.

11. The signal processing device of claim 8 wherein said preselected period of time is substantially equal to one quarter the period of a frequency required to propagate acoustic surface waves at said predetermined wavelength.

12. The signal processing device of claim 8 wherein said first and said second transducer means are positioned on opposite sides of said third transducer means, and wherein a portion of surface waves launched by said first transducer means and reflected by said second transducer means produce a second undesired signal in said third transducer means, wherein a portion of surface waves launched by said second transducer means and reflected by said first transducer means inhibit said second undesired signal.

13. The signal processing device of claim 8 wherein said output signal and said first input signal can be reversed.

14. A method for reducing undesired signals in acoustic surface wave devices originating from surface waves from an input electroacoustic transducer, reflected from an output electroacoustic transducer and reflected once again from said input transducer and interacting with said output transducer to produce said undesired signals, comprising the steps of: providing a first acoustic surface wave channel for traversal of surface waves between a first input electroacoustic transducer and said output transducer; providing a second acoustic surface wave channel for traversal of surface waves between a second input electroacoustical transducer and said output transducer, wherein traversal of acoustic surface waves of a predetermined wavelength requires a preselected period of time longer than traversal through said first channel by acoustic surface waves of said predetermined wavelength; applying an input signal to said second transducer; and applying said input signal delayed by substantially said preselected period to said first transducer, wherein acoustic waves generated by said first transducer and said second transducer generate a desired output signal in said output transducer, wherein said undesired output signals generated in said output transducer by a portion of first channel surface waves reflected by said output transducer and said first input transducer are inhibited signals in said output transducer generated by a portion of said second channel surface waves reflected from said output transducer and said second input transducer.

15. An electroacoustic surface wave device having means to substantially cancel undesired signals comprising:

an acoustic surface wave medium;
at least two input transducers;
at least one output transducer;
the at least two input transducers and the at least one output transducer being mounted on the medium;
a delay means located between one of the at least two input transducers and the at least one output transducer so that when an input signal is applied to another of the at least two input transducers through a delay device having substantially the same amount of delay as the delay means then undesired signals within the electroacoustic surface wave device are substantially cancelled.

16. The electroacoustic surface wave device of claim 15 wherein the delay means is an electrode on the acoustic surface wave medium.

17. The electroacoustic surface wave device of claim 15 wherein the delay means delays a surface wave by a multiple of one quarter of its wave length.

* * * * *